(12) United States Patent
Orlando et al.

(10) Patent No.: US 7,685,808 B2
(45) Date of Patent: Mar. 30, 2010

(54) GAS TURBINE ENGINE ASSEMBLY AND METHODS OF ASSEMBLING SAME

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 1116 days.

(21) Appl. No.: 11/254,143

(22) Filed: Oct. 19, 2005

(65) Prior Publication Data

US 2007/0240399 A1 Oct. 18, 2007

(51) Int. Cl.
*F02K 3/02* (2006.01)

(52) U.S. Cl. .................................. 60/268; 60/226.1

(58) Field of Classification Search ............... 60/228, 60/226.1, 39.162, 28; 415/9, 174.4; 416/2
See application file for complete search history.

(56) References Cited

U.S. PATENT DOCUMENTS

| | | | |
|---|---|---|---|
| 2,672,726 A * | 3/1954 | Wolf et al. ................. 60/225 |
| 3,729,957 A * | 5/1973 | Petrie et al. ............... 60/226.1 |
| 3,866,415 A * | 2/1975 | Ciokajlo .................... 60/226.1 |
| 4,005,575 A * | 2/1977 | Scott et al. ................ 60/226.1 |
| 4,251,987 A * | 2/1981 | Adamson ................... 60/805 |
| 4,688,995 A * | 8/1987 | Wright et al. .............. 416/127 |
| 4,751,816 A * | 6/1988 | Perry ........................ 60/226.1 |
| 4,790,133 A * | 12/1988 | Stuart ....................... 60/226.1 |
| 4,827,712 A * | 5/1989 | Coplin ...................... 60/226.1 |
| 4,909,031 A | 3/1990 | Grieb |
| 4,947,642 A | 8/1990 | Grieb et al. |
| 5,010,729 A | 4/1991 | Adamson et al. |
| 5,105,618 A * | 4/1992 | Lardellier ................... 60/226.1 |
| 5,274,999 A * | 1/1994 | Rohra et al. ................. 60/226.1 |
| 5,307,622 A * | 5/1994 | Ciokajlo et al. ............. 60/39.162 |
| 5,361,580 A * | 11/1994 | Ciokajlo et al. ............. 60/226.1 |
| 5,806,303 A | 9/1998 | Johnson |
| 5,809,772 A | 9/1998 | Giffin, III et al. |
| 5,813,214 A | 9/1998 | Moniz et al. |
| 5,867,980 A | 2/1999 | Bartos |
| 6,158,210 A * | 12/2000 | Orlando ..................... 60/226.1 |
| 6,339,927 B1 | 1/2002 | Di Pietro, Jr. |
| 6,381,948 B1 * | 5/2002 | Klingels ..................... 60/226.1 |

(Continued)

FOREIGN PATENT DOCUMENTS

| GB | 594206 | 11/1947 |
|---|---|---|
| GB | 2205360 A | 12/1988 |

OTHER PUBLICATIONS

Search Report dated Feb. 19, 2007; Reference No. 13DV-191333/11850; Application No. GB0620427.5; United Kingdom; 3 pgs.

*Primary Examiner*—William H Rodríguez
(74) *Attorney, Agent, or Firm*—William Scott Andes, Esq.; Armstrong Teasdale LLP

(57) ABSTRACT

A method for assembling a gas turbine engine includes providing a core gas turbine engine including a high-pressure compressor, a combustor, and a turbine, and coupling a counter-rotating fan assembly to the core gas turbine engine such that air discharged from the counter-rotating fan assembly is channeled directly into an inlet of the gas turbine engine compressor.

20 Claims, 4 Drawing Sheets

U.S. PATENT DOCUMENTS

| | | |
|---|---|---|
| 6,619,030 B1 | 9/2003 | Seda et al. |
| 6,622,473 B2 * | 9/2003 | Becquerelle et al. ....... 60/226.1 |
| 6,684,626 B1 | 2/2004 | Orlando et al. |
| 6,711,887 B2 | 3/2004 | Orlando et al. |
| 6,732,502 B2 | 5/2004 | Seda et al. |
| 6,739,120 B2 * | 5/2004 | Moniz et al. ............... 60/226.1 |
| 6,763,652 B2 | 7/2004 | Baughman et al. |
| 6,763,653 B2 | 7/2004 | Orlando et al. |
| 6,763,654 B2 * | 7/2004 | Orlando et al. ............ 60/226.1 |
| 7,195,447 B2 * | 3/2007 | Moniz et al. .................. 415/69 |
| 7,296,398 B2 * | 11/2007 | Moniz et al. .................. 60/268 |
| 7,299,621 B2 * | 11/2007 | Bart et al. .................. 60/226.1 |
| 7,458,773 B2 * | 12/2008 | Brault et al. .............. 415/216.1 |
| 2006/0090451 A1 * | 5/2006 | Moniz et al. ................ 60/226.1 |
| 2007/0084184 A1 * | 4/2007 | Orlando et al. ................ 60/204 |
| 2007/0084185 A1 * | 4/2007 | Moniz et al. .................. 60/204 |
| 2007/0084186 A1 * | 4/2007 | Orlando et al. ............... 60/204 |
| 2007/0084187 A1 * | 4/2007 | Moniz et al. .................. 60/204 |
| 2007/0084188 A1 * | 4/2007 | Orlando et al. ............... 60/204 |
| 2007/0084189 A1 * | 4/2007 | Moniz et al. .................. 60/204 |
| 2007/0084190 A1 * | 4/2007 | Moniz et al. .................. 60/204 |
| 2007/0240399 A1 * | 10/2007 | Orlando et al. .......... 60/39.162 |
| 2008/0098716 A1 * | 5/2008 | Orlando et al. ............ 60/226.1 |

* cited by examiner

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a forward fan, a core engine, and a power turbine. The core engine includes at least one compressor, a combustor, a high-pressure turbine and a low-pressure turbine coupled together in a serial flow relationship. More specifically, the compressor and high-pressure turbine are coupled through a shaft to define a high-pressure rotor assembly. Air entering the core engine is mixed with fuel and ignited to form a high energy gas stream. The high energy gas stream flows through the high-pressure turbine to rotatably drive the high-pressure turbine such that the shaft, in turn, rotatably drives the compressor.

The gas stream expands as it flows through the low-pressure turbine positioned forward of the high-pressure turbine. The low-pressure turbine includes a rotor assembly having a fan coupled to a drive shaft. The low-pressure turbine rotatably drives the fan through the drive shaft. To facilitate increasing engine efficiency, at least one known gas turbine engine includes a counter-rotating low-pressure turbine that is coupled to a counter-rotating fan and a booster compressor.

An outer rotating spool, a rotating frame, a mid-turbine frame, and two concentric shafts, are installed within the gas turbine engine to facilitate supporting the counter-rotating low-pressure turbine. The installation of the aforementioned components also enables a first fan assembly to be coupled to a first turbine and a second fan assembly to be coupled to a second turbine such that the first fan assembly and the second fan assembly each rotate in the same rotational direction as the first turbine and the second turbine, respectively. Accordingly, the overall weight, design complexity and/or manufacturing costs of such an engine are increased.

BRIEF DESCRIPTION OF THE INVENTION

In one aspect, a method of assembling a gas turbine engine is provided. The method includes providing a core gas turbine engine including a high-pressure compressor, a combustor, and a turbine, and coupling a counter-rotating fan assembly to the core gas turbine engine such that air discharged from the counter-rotating fan assembly is channeled directly into an inlet of the gas turbine engine compressor.

In another aspect, a turbine engine assembly is provided. The turbine engine assembly includes a core gas turbine engine including a high-pressure compressor, a combustor, and a turbine, and a counter-rotating fan assembly coupled to the core gas turbine engine such that air discharged from the counter-rotating fan assembly is channeled directly into an inlet of the gas turbine engine compressor.

DETAILED DESCRIPTION OF THE INVENTION

Figure 1:
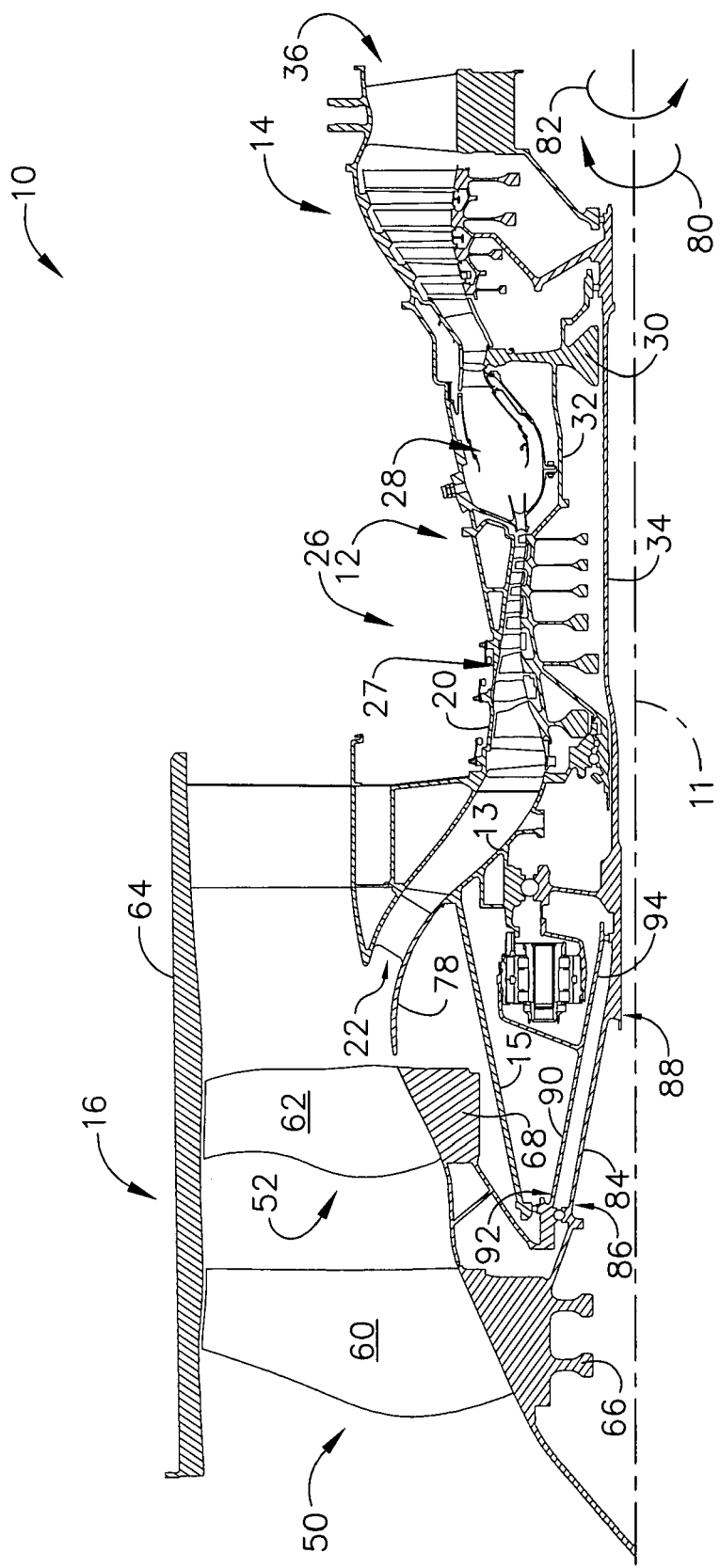
FIG. 1 is a cross-sectional view of a portion of an exemplary turbine engine assembly.

FIG. 1 is a cross-sectional view of a portion of an exemplary turbine engine assembly 10 having a longitudinal axis 11. In the exemplary embodiment, turbine engine assembly 10 includes a core gas turbine engine 12 generally defined by a frame 13. A low-pressure turbine 14 is coupled axially aft of core gas turbine engine 12 and a counter-rotating fan assembly 16 is coupled axially forward of core gas turbine engine 12.

Core gas turbine engine 12 includes an outer casing 20 that defines an annular core engine inlet 22. In one embodiment, core gas turbine engine 12 is a core CFM56 gas turbine engine available from General Electric Aircraft Engines, Cincinnati, Ohio.

A high-pressure, multi-stage, axial-flow compressor 26 receives pressurized air directly from fan assembly 16, without passing through a booster compressor, and further increases the pressure of the air to a second, higher pressure level. More specifically, air is discharged from the counter-rotating fan assembly 16 at a first operating pressure, channeled through a gooseneck 78, and received at core gas turbine high-pressure compressor 26 at approximately the first or same operational pressure. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first rotatable drive shaft 32, and then to second or low-pressure turbine 14 to facilitate driving counter-rotating fan assembly 16 through a second rotatable drive shaft 34 that is coupled coaxially with first drive shaft 32. After driving low-pressure turbine 14, the combustion products leave turbine engine assembly 10 through an exhaust nozzle 36 to provide propulsive jet thrust. In the exemplary embodiment, FIG. 1 illustrates a high-pressure turbine 30 having a single stage. Optionally, high-pressure turbine 30 may have a plurality of stages a quantity of which is selected based on the overall desired compression ratio of the turbine engine assembly.

In one embodiment, counter-rotating fan assembly discharges a predetermined quantity of air based on the gas turbine engine compression ratio to the core gas turbine engine. More specifically, high-pressure compressor 26 includes a plurality of stages 27 wherein each stage further increases the pressure from the previous stage such that core gas turbine engine 12 has a compression ratio based on the quantity of stages 27 utilized within high-pressure compressor 26. Moreover, although a single core gas turbine is illustrated, it should be realized that the gas turbine engine 12 may include a compressor having any quantity of compression stages, and thus a wide variety of compression ratios.

Accordingly, in one embodiment, core gas turbine engine 12 includes a plurality of compression stages 27 that are predetermined based on the quantity and/or pressure of the compressed air discharged from the counter-rotating fan assembly. For example, a core gas turbine engine having a first compression ratio may be coupled to a fan assembly 16 having a first compression ratio. If the compression ratio of fan assembly is increased, the fan assembly 16 may be utilized with a core gas turbine engine 12 having a reduced compression ratio. Alternatively, if the compression ratio of the fan assembly 16 is reduced, fan assembly 16 may be utilized with a core gas turbine engine 12 that includes an increased quantity of stages and thus has an increased compression ratio. In the exemplary embodiment, high-pressure compressor 26 includes at least six compression stages 27. Therefore, fan assembly 16 may be selectively sized to be coupled to a wide variety of core gas turbine engines. Optionally, a single core gas turbine engine compressor may be modified by either increasing or decreasing the quantity of compression stages, i.e. greater or lesser than six stages, to facilitate coupling the core gas turbine engine to the fan assembly.

Figure 2:
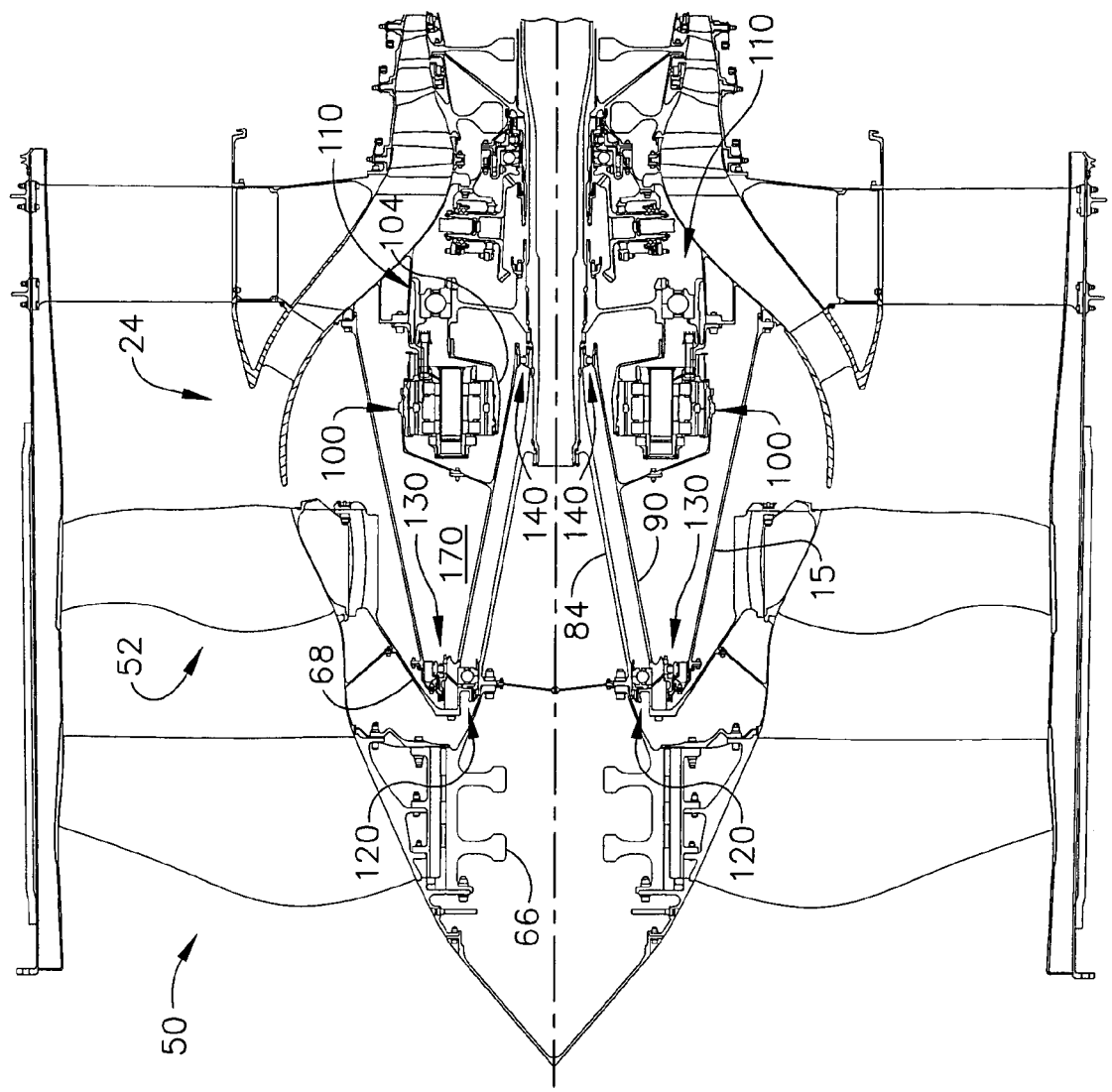
FIG. 2 is an enlarged cross-sectional view of a portion of a counter-rotating fan assembly shown in FIG. 1.
Figure 3:
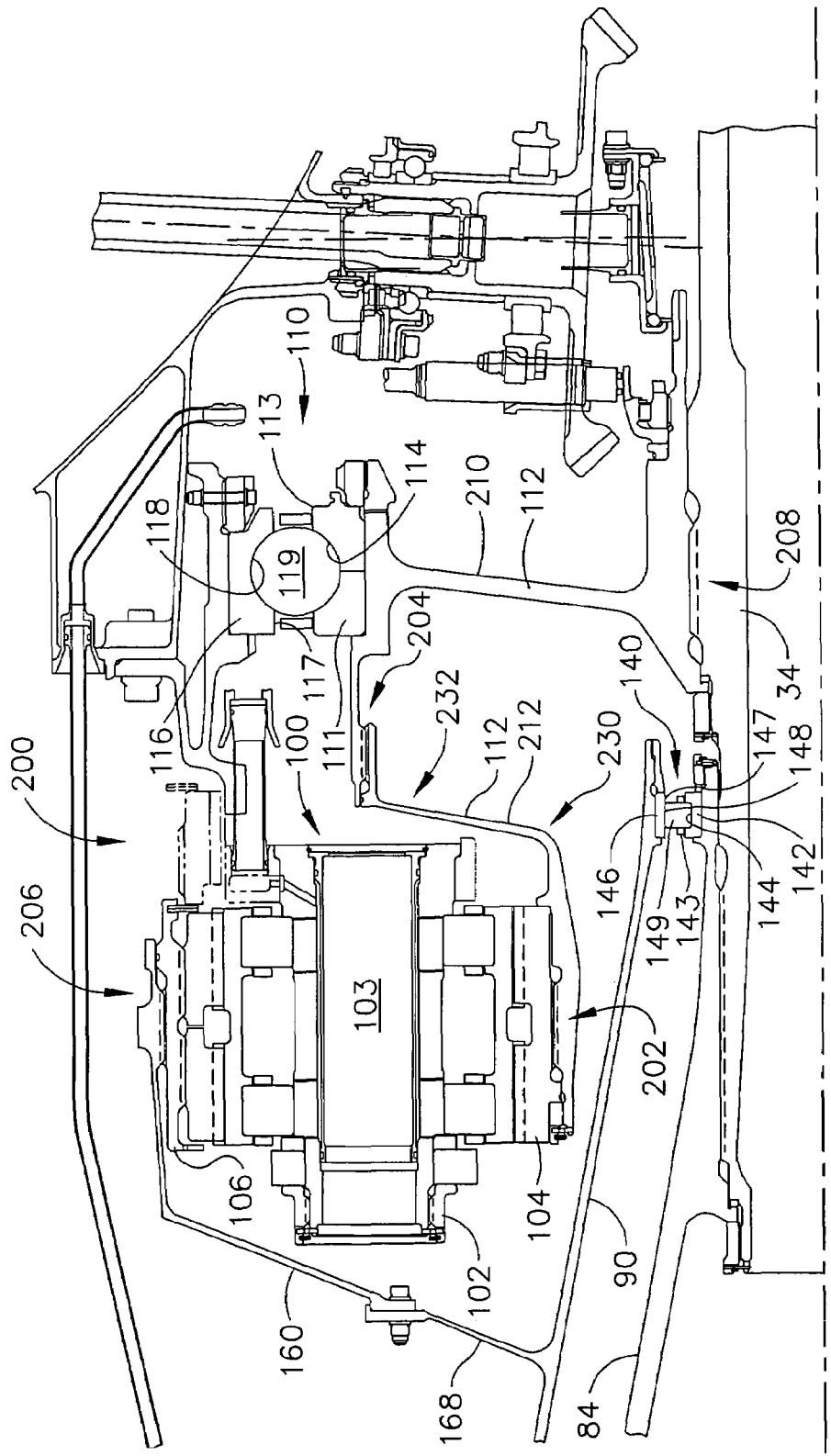
FIG. 3 is an enlarged cross-sectional view of a portion of the counter-rotating fan assembly shown in FIG. 2.

Counter-rotating fan assembly 16 includes a first or forward fan assembly 50 and a second or an aft fan assembly 52 configured to rotate about longitudinal axis 11. The terms "forward fan" and "aft fan" are used herein to indicate that fan assembly 50 is coupled axially upstream from fan assembly 52. In one embodiment, fan assemblies 50 and 52 are positioned at a forward end of core gas turbine engine 12, as shown in FIGS. 1-3. In an alternative embodiment, fan assemblies 50 and 52 are positioned at an aft end of core gas turbine engine 12. Fan assemblies 50 and 52 each includes at least one row of rotor blades 60 and 62, respectively, and are positioned within a nacelle 64. Rotor blades 60 are coupled to rotor disk 66 and rotor blades 62 are coupled to rotor disk 68. In one embodiment, turbine engine assembly 10 a gooseneck 78 that extends between and facilitates coupling fan assembly 16 to core gas turbine engine 12. Moreover, gooseneck 78 includes a structural strut and/or aero strut to facilitate channeling air discharged from aft fan assembly 52, through gooseneck 78, to core gas turbine engine 12. As such, the configuration of gooseneck 78 and the structural strut facilitate substantially reducing and/or eliminating ice and/or foreign particle ingestion into core gas turbine engine 12 since core inlet gooseneck substantially "hides" the core gas turbine engine inlet from the main air flowstream that is channeled axially past the exterior surface of gooseneck 78 in an aftward direction.

As shown in FIG. 1, low-pressure turbine 14 is coupled to forward fan assembly 50 through shaft 34 such that forward fan assembly 50 rotates in a first rotational direction 80. Aft fan assembly 52 is coupled to drive shaft 34 and/or low-pressure turbine 14 such that aft fan assembly 52 rotates in an opposite second rotational direction 82.

FIG. 2 is a schematic diagram of a portion of counter-rotating fan assembly 16 shown in FIG. 1. In one embodiment, first fan assembly 50 includes a cone 84 positioned about longitudinal axis 11. Cone 84 is connected at a first or forward end 86 to rotor disk 66 and at a second or aft end 88 to drive shaft 34, as shown in FIG. 2. Second fan assembly 52 includes a cone 90 positioned coaxially about at least a portion of cone 84 along longitudinal axis 11. Cone 90 is coupled at a first or forward end 92 to rotor disk 68 and at a second or aft end 94 to an output of a gearbox 100 and/or to aft end 88 of cone 84 via a rolling bearing assembly, as described in greater detailed below.

FIG. 3 is a schematic diagram of a portion of the counter-rotating fan assembly 16 shown in FIG. 2. In one embodiment, counter-rotating fan assembly 16 also includes a gearbox 100 that is coupled between aft fan assembly 52 and drive shaft 34 to facilitate rotating aft fan assembly 52 in opposite rotational direction 82 with respect to rotational direction 80 in which forward fan assembly 50 rotates. Gearbox 100 has a generally toroidal shape and is configured to be positioned circumferentially about drive shaft 34 to extend substantially about drive shaft 34. As shown in FIG. 3, gearbox 100 includes a support structure 102, at least one gear 103 coupled within support structure 102, an input 104 and an output 106.

In one embodiment, gearbox 100 has a gear ratio of approximately 2.0 to 1 such that forward fan assembly 50 rotates at a rotational speed that is approximately twice the rotational speed of aft fan assembly 52. In another embodiment, forward fan assembly 50 rotates with a rotational speed that is between approximately 0.67 and approximately 2.1 times faster than the rotational speed of aft fan assembly 52. In this embodiment, forward fan assembly 50 may rotate at a rotational speed greater than, equal to or less than the rotational speed of aft fan assembly 52.

In one embodiment, a first bearing assembly, such as thrust bearing assembly 110 as shown in FIGS. 1-3, is positioned about drive shaft 34 and/or longitudinal axis 11. Thrust bearing assembly 110 operatively couples and/or is mounted between drive shaft 34 and frame 13 of core gas turbine engine 12. Referring further to FIG. 3, in one embodiment, thrust bearing assembly 110 includes a radially positioned inner race 111 that is mounted with respect to drive shaft 34. As shown in FIG. 3, inner race 111 is mounted to a drive shaft extension 112 operatively coupled to drive shaft 34 so that inner race 111 is rotatable about longitudinal axis 11 with drive shaft 34. In one particular embodiment, drive shaft extension 112 is splined to drive shaft 34. Inner race 111 has a surface 113 defining an inner groove 114 of thrust bearing assembly 110. Surface 113 defining inner groove 114 has a generally arcuate profile.

Thrust bearing assembly 110 includes a radially positioned outer race 116 securely coupled to frame 13. In one embodiment, outer race 116 and/or frame 13 acts as a ground for the transfer of thrust loads and/or forces developed or generated by counter-rotating fan assembly 16, as discussed in greater detail below. Outer race 116 has a surface 117, generally opposing surface 113, which forms an outer groove 118 of thrust bearing assembly 110. Surface 117 defining outer groove 118 has a generally arcuate profile. At least one roller element, such as a plurality of bearings 119, is movably positioned between inner race 111 and outer race 116. Each bearing 119 is in rolling contact with inner groove 114 and outer groove 118 to allow drive shaft 34 to rotate freely with respect to gearbox 100.

Figure 4:
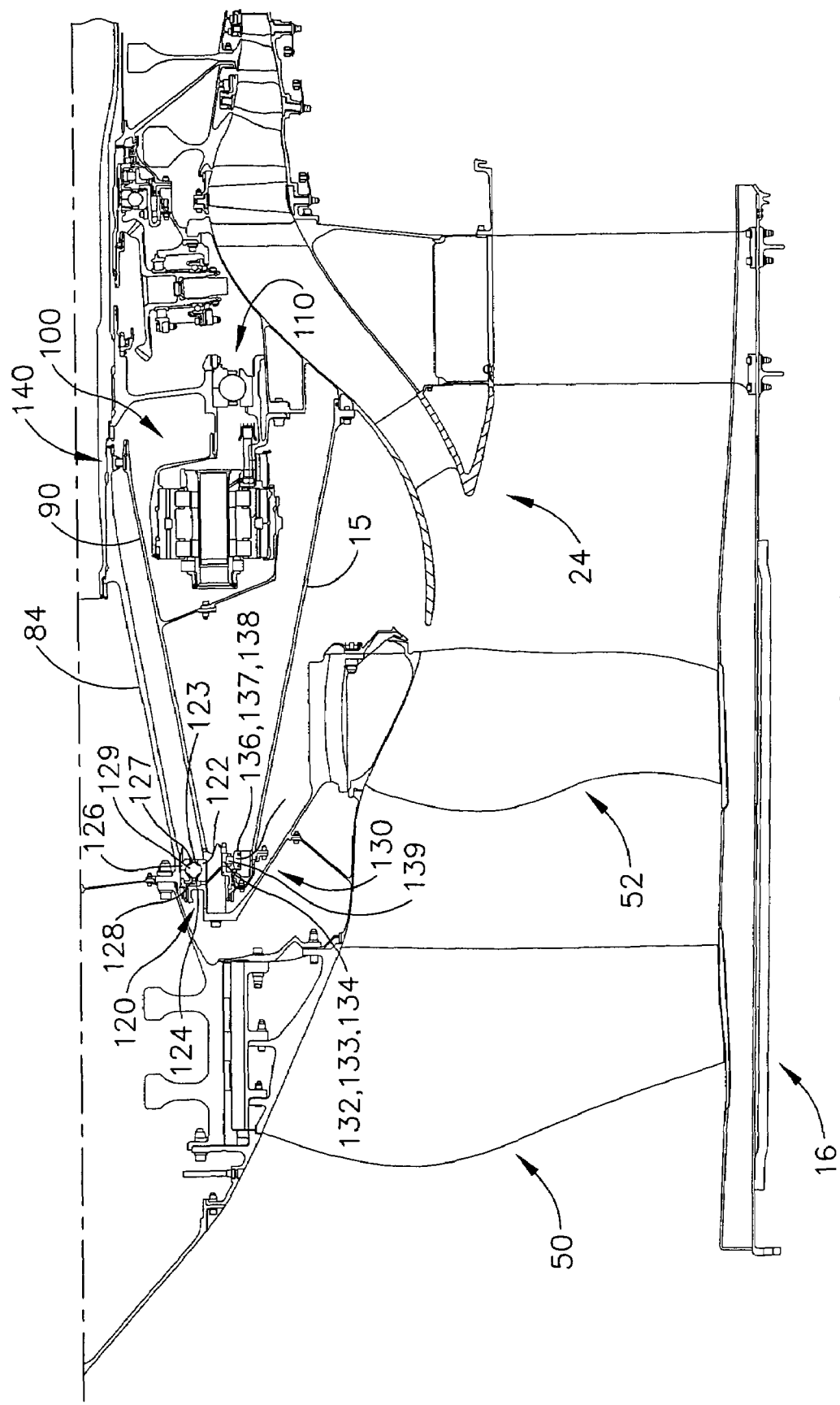
FIG. 4 is an enlarged cross-sectional view of a portion of the counter-rotating fan assembly shown in FIG. 2.

Referring to FIG. 4, a second bearing assembly, such as thrust bearing assembly 120, is positioned radially about longitudinal axis 11. In one embodiment, thrust bearing assembly 120 operatively couples and/or is mounted between a forward end portion of first fan assembly 50, such as at or near forward end 86 of cone 84, and a forward end portion of second fan assembly 52, such as at or near forward end 92 of cone 90. In one embodiment, thrust bearing assembly 120 includes a radially positioned inner race 122 that is mounted with respect to an outer surface of cone 84. As shown in FIG. 4, inner race 122 is mounted to cone 84 so that inner race 122 is rotatable about longitudinal axis 11 with first fan assembly 50. Inner race 122 has a surface 123 defining an inner groove 124 of thrust bearing assembly 110. Surface 123 defining inner groove 124 has a generally arcuate profile.

Thrust bearing assembly 120 includes a radially positioned outer race 126 that is mounted with respect to an inner surface of cone 90. As shown in FIG. 4, inner race 122 is mounted to cone 90 so that outer race 126 is rotatable about longitudinal axis 11 with second fan assembly 52. Outer race 126 has a surface 127, generally opposing surface 123, which forms an outer groove 128 of thrust bearing assembly 120. Surface 127 defining outer groove 128 has a generally arcuate profile. At least one roller element, such as a plurality of bearings 129, is movably positioned between inner race 122 and outer race 126. Each bearing 129 is in rolling contact with inner groove 124 and outer groove 128 to facilitate relative rotational movement of first fan assembly 50 and/or second fan assembly 52.

In one embodiment, thrust bearing assemblies 110 and/or 120 facilitate maintaining forward fan assembly 50 and/or aft fan assembly 52 in a relatively fixed axial position. During operation of counter-rotating Ian assembly 16, thrust loads and/or forces generated by first fan assembly 50 are transferred directly from first fan assembly 50 to first thrust bearing assembly 110, Further, thrust loads and/or forces generated by second fan assembly 52 during operation are transferred from second fan assembly 52 to second thrust bearing assembly 120 and from second thrust bearing assembly 120 through drive shaft 34 to first thrust bearing assembly 110. As a result of transferring thrust loads and/or forces to thrust bearing assembly 110 and/or thrust bearing assembly 120, the transfer of thrust loads and/or forces through gearbox 100, operatively coupled to second fan assembly 52, is prevented or limited. In alternative embodiments, any suitable bearing assembly known to those skilled in the art and guided by the teachings herein provided can be used for or in addition to bearing assembly 110 and/or bearing assembly 120.

In one embodiment, a bearing assembly, such as roller bearing assembly 130, is positioned about the outer surface of cone 90 at or near forward end 92, as shown in FIG. 4. Roller bearing assembly 130 is connected between frame 13 and forward end 92. In one embodiment, roller bearing assembly 130 acts as a differential bearing assembly in combination with thrust bearing assembly 120 to support second fan assembly 52 and/or transfer thrust loads and/or forces from second fan assembly 52 to frame 13. In one embodiment, roller bearing assembly 130 includes an inner race 132 that is mounted with respect to cone 90, as shown in FIG. 4. Inner race 132 is mounted to forward end 92 of cone 90 so that inner race 132 is rotatable about longitudinal axis 11 with second fan assembly 52. Inner race 132 has a surface 133 defining an inner groove 134 of roller bearing assembly 130.

Roller bearing assembly 130 includes an outer race 136 that is securely coupled to frame 13. In one embodiment, outer race 136 is securely coupled with respect to structural support member 15 and/or frame 13. Structural support member 15 and/or frame 13 acts as a ground for the transfer of thrust loads and/or forces developed or generated by counter-rotating fan assembly 16. Outer race 136 has a surface 137, generally opposing surface 133, which forms an outer groove 138 of roller bearing assembly 130. At least one roller element, such as a plurality of rollers 139, is movably positioned between inner race 132 and outer race 136. Each roller 139 is in rolling contact with inner groove 134 and outer groove 138.

In one embodiment, a bearing assembly, such as roller bearing assembly 140, is positioned about the outer surface of cone 84 at or near aft end 88, as shown in FIG. 3. Roller bearing assembly 140 is connected between cone 84 and cone 90. Roller bearing assembly 140 includes an inner race 142 that is mounted with respect to aft end 88, as shown in FIG. 2. Inner race 142 is mounted to cone 84 so that inner race 142 is rotatable about longitudinal axis 11 with first fan assembly 50. Inner race 142 has a surface 143 defining an inner groove 144 of roller bearing assembly 140.

Roller bearing assembly 140 includes an outer race 146 that is mounted with respect to aft end 94 of cone 90, as shown in FIG. 3. Outer race 146 is mounted to cone 90 so that outer race 146 is rotatable about longitudinal axis 11 with second fan assembly 52. Outer race 146 has a surface 147, generally opposing surface 143, which forms an outer groove 148 of roller bearing assembly 140. At least one roller element, such as a plurality of rollers 149, is movably positioned between inner race 142 and outer race 146. Each roller 149 is in rolling contact with inner groove 144 and outer groove 148 to facilitate relative rotational movement of cone 84 and/or cone 90.

In this embodiment, roller bearing assemblies 130 and 140 facilitate providing rotational support to aft fan assembly 52 such that aft fan assembly 52 can rotate freely with respect to forward fan assembly 50. Accordingly, roller bearing assemblies 130 and 140 facilitate maintaining aft fan assembly 52 in a relatively fixed radial position within counter-rotating fan assembly 16. In alternative embodiments, any suitable bearing assembly known to those skilled in the art and guided by the teachings herein provided can be used for or in addition to bearing assembly 130 and/or bearing assembly 140.

In one embodiment, gearbox 100 is connected to a fixed or stationary component of gas turbine engine 10, such as frame 13 of core turbine engine 12, as shown in FIG. 3. Gearbox input 104 is rotatably coupled to second drive shaft 34 through drive shaft extension 112 that is splined to drive shaft 34. Gearbox output 106 is rotatably coupled to aft fan assembly 52 through an output structure 160. A first end of output structure 160 is splined to gearbox output 106 and~a second end of output structure 160 is coupled to aft fan forward shaft 168 to facilitate driving aft fan assembly 52.

Referring to FIG. 3, in one embodiment, gas turbine engine assembly 10 includes a spline system 200 for mounting gearbox 100 to counter-rotating fan assembly 16. Gearbox 100 is fixedly or securely coupled to frame 13 of core gas turbine engine 12, for example at gearbox support structure 102. Spline system 200 isolates gearbox 100 from first fan assembly 50 and/or second fan assembly 52 to prevent or limit thrust loads and/or forces exerted on gearbox 100 as a result of counter-rotating fan assembly 16 operation. First fan assembly 50 is rotatably coupled to input 104 such that first fan assembly 50 rotates in a first direction, as indicated by rotational arrow 80 in FIG. 1. Second fan assembly 52 is rotatably coupled to output 106 such that second fan assembly 52 rotates in a second direction, as indicated by rotational arrow 82 in FIG. 1, opposite the first direction.

As shown in FIG. 3, spline system 200 includes a plurality of spline assemblies, such as spline assembly 202, 204, 206 and/or 208. In one embodiment, a first spline assembly 202 couples input 104 to drive shaft extension 112. Drive shaft extension 112 includes a first portion 210 and a second portion 212, as shown in FIG. 3. First spline assembly 202 couples input 104 to first portion 10 and a second spline assembly 204, the same or similar to first spline assembly 202, couples first portion 210 to second portion 212 to rotatably couple input 104 to drive shaft 34. Further, second spline assembly 204 facilitates movement of thrust bearing assembly 110 with respect to gearbox 100 in the axial direction, i.e., along or parallel with longitudinal axis 11 of turbine engine assembly 10.

In one embodiment, spline assembly 204 includes a member forming a plurality of splines positioned about a periphery of the member. The member, connected to second portion 212 of drive shaft extension 112, is positionable within a cavity formed in a cooperating housing, connected to first portion 210, such that the plurality of splines mesh or interfere with slots formed on an inner periphery of the housing to transfer torsional loads and/or forces from second portion 212 to first portion 210 of drive shaft extension 112. Further, the member is positioned within the cooperating housing to facilitate movement of the member within the housing in an axial direction, e.g., along or parallel with longitudinal axis 11, which facilitates axial movement of second portion 212 with respect to first portion 210.

In one particular embodiment, each spline assembly 204, 206 and 208 are the same or similar, as described above with reference to spline assembly 204. A third spline assembly 206 slidably couples output 106 to output structure 160. Third spline assembly 206 facilitates axial movement of aft fan forward shaft 168 with respect to gearbox 100. In one embodiment, a fourth spline assembly 208 slidably couples second portion 212 of drive shaft extension 112 to drive shaft 34. During operation, spline assemblies 202, 204, 206 and/or 208 pass only torsional or torque loads and/or forces to gearbox 100 such that gearbox 100 remains in a substantially fixed position with respect to the frame of low-pressure turbine 14.

In one embodiment, drive shaft extension 112 and/or output structure 160 include at least one flexible arm compensating for a radial deflection of gearbox 100. In a particular embodiment, first portion 210 includes a radially inner portion 230 that is coupled to input 104 through spline assembly 202 and a radially outer portion 232 that is coupled to second portion 212 through spline assembly 204. First portion 210 has a first thickness at or near inner portion 230 and a second thickness at or near outer portion 232, which is less than first thickness 240. In this particular embodiment, a thickness of first portion 210 gradually decreases from radially inner portion 230 to radially outer portion 232. The second thickness is selected such that first portion 230 will separate from second portion 232, i.e. first portion 210 will break, when first portion 210 is subjected to a determined torsional load and/or force. During operation of engine assembly 10, relatively large radial loads and/or forces may be applied to aft fan assembly 52. To compensate for the relatively large radial loads and/or forces, and to ensure continued engine operation, in one embodiment first portion 210 breaks such that forward fan assembly 50 continues to operate as aft fan assembly 52 freewheels.

During operation, as second drive shaft 34 rotates, second drive shaft 34 causes input 104 to rotate in first rotational direction 80, which subsequently rotates output 106 in opposite second rotational direction 82. Because output structure 160 is coupled to aft fan assembly 52, drive shaft 34 causes aft fan assembly 52 to rotate via gearbox 100 in opposite second direction 82. In one embodiment, gearbox 100 is located within a sump 170 at least partially defined between output structure 160 and structural support member 15 configured to support aft fan assembly 52. During operation, gearbox 100 is at least partially submerged within lubrication fluid contained in sump 170 to continuously lubricate gearbox 100 during engine operation.

The gas turbine engine assembly described herein includes a counter-rotating fan assembly having a geared single rotation low-pressure turbine. The assembly facilitates reducing at least some of the complexities associated with known counter-rotating low-pressure turbines. More specifically, the gas turbine engine assembly described herein includes a front fan that is rotatably coupled to a single rotation low-pressure turbine, and an aft fan that is rotatably coupled together, and driven by, the low-pressure turbine via a gearbox. Moreover, the aft fan assembly is driven at the same speed, which, in one embodiment, is approximately one-half the front fan speed. Additionally, the gas turbine engine assembly described herein is configured such that approximately 30% of power generated by the low-pressure turbine is transmitted through the gearbox to the aft fan assembly to facilitate reducing gear losses. Therefore, in the event of a gearbox failure, the aft Ian assembly will cease to rotate. However, the front fan assembly will continue to rotate because the front Ian assembly is directly driven by the low-pressure turbine.

Additionally, the above-described gas turbine engine does not include a booster compressor. As a result, eliminating the booster compressor results in a simpler, lower cost, and lower weight engine than at least one known counter-rotating engine.

More specifically, the booster can be eliminated because a high-pressure ratio core is used in conjunction with the increased core stream pressure ratio that can be obtained with the two counter rotating fans. The systems described herein facilitate reducing the size of the gear and gear losses since the gear horsepower may be reduced by approximately 25%, i.e. from approximately 40% to approximately 30%, the speed ratio between the two counter-rotating fans is optimized for performance since no booster stage count issues exists, the interaction loss between the high-pressure turbine (HPT) and the low-pressure turbine (LPT) is substantially eliminated thus resulting in approximately 0.8% increase in LPT efficiency, the two-stage HPT is approximately 3% more efficient than the known single stage HPT thus increasing overall pressure ratio for additional thermodynamic improvements. Moreover, the LPT shaft horsepower and torque are reduced by approximately 10%, which will result in a smaller shaft, and allowing smaller HPT disk bores which will increase parts life by lowering stress and lowering weight. Additionally, no variable bleed valves (VBV) bleed doors are utilized, and ice and foreign particle ingestion is substantially eliminated because the booster-less engine will allow the core inlet gooseneck to be hidden.

Further, the two-stage HPT facilitates increasing the capability of power extraction off the HP spool. The LPT power requirements (Aero Dynamic Loading) are reduced by about 10% resulting in either an improvement in efficiency and/or reduced weight, a simpler thrust reverser design can be utilized, additional space tinder the core cowl may he available to locate the accessory gearbox and larger multiple generators, a shorter fan case, and a simpler, lighter, thinner inlet fan duct.

Exemplary embodiments of a gas turbine engine assembly and methods of assembly the gas turbine engine assembly are described above in detail. The assembly and method arc not limited to the specific embodiments described herein, but rather, components of the assembly and/or steps of the method may be utilized independently and separately from other components and/or steps described herein. Further, the described assembly components and/or the method steps can also be defined in, or used in combination with, other assemblies and/or methods, and are not limited to practice with only the assembly and/or method as described herein.

While the invention has been described in terms of various specific embodiments, those skilled in the art will recognize that the invention can be practiced with modification within the spirit and scope of the claims.

What is claimed is:

1. A method of assembling a gas turbine assembly said method comprising:
providing a core gas turbine engine including a high-pressure compressor, a combustor, a low-pressure turbine, and a high-pressure turbine;
coupling a counter-rotating fan assembly including a first fan assembly and a second fan assembly to the core gas turbine engine such that air discharged from the counter-rotating fan assembly is channeled directly into an inlet of the gas turbine engine compressor via a passage without passing through a booster compressor;
coupling a gearbox between the low-pressure turbine and the second fan assembly such that the second fan assembly rotates at a rotational speed that is different than the rotational speed of the first fan assembly;
coupling the counter-rotating fan assembly to the low-pressure turbine such that the low-pressure turbine rotates the counter-fan assembly; and
coupling a downstream end of the compressor against the combustor such that air discharged from the compressor is channeled to the combustor.

2. A method in accordance with claim 1 wherein coupling a counter-rotating fan assembly further comprises coupling a counter-rotating fan assembly to the core gas turbine engine such that compressed air is discharged from the counter-rotating fan assembly at a first operating pressure and received at the core gas turbine high-pressure compressor at approximately the first operational pressure.

3. A method in accordance with claim 1 wherein coupling a counter-rotating fan assembly further comprises coupling a counter-rotating fan assembly including a first fan assembly and a second fan assembly to the core gas turbine engine such that the first fan assembly rotates in a first direction and the second fan assembly rotates in an opposite second direction.

4. A method in accordance with claim 1 wherein coupling a counter-rotating fan assembly further comprises coupling a counter-rotating fan assembly that discharges a predetermined quantity of air based on the gas turbine engine compression ratio to the core gas turbine engine.

5. A method in accordance with claim 1 wherein providing a core gas turbine engine comprises providing a core gas turbine engine that includes a predetermined quantity of compressor stages based on the quantity of compressed air discharged from the counter-rotating fan assembly.

6. A method in accordance with claim 1 wherein providing a core gas turbine engine comprises providing a core gas turbine engine that includes ten compressor stages and two high-pressure turbine stages.

7. A method in accordance with claim 3 further comprising:
coupling a low-pressure turbine to the first fan assembly such that the first fan assembly rotates in a first direction; and
coupling a gearbox between the low-pressure turbine assembly and the second fan assembly such that the second fan assembly rotates in a second opposite direction.

8. A method in accordance with claim 3 further comprising coupling a counter-rotating fan assembly including a first fan assembly and a second fan assembly to the low-pressure turbine such that the first fan assembly rotates at a first rotational speed and the second fan assembly rotates at a second different rotational speed.

9. A method in accordance with claim 7 further comprising:
coupling a shaft between a low-pressure turbine and the first fan assembly such that the first fan assembly rotates at approximately the same rotational speed as the low-pressure turbine.

10. A method in accordance with claim 1 further comprising coupling a gearbox between the low-pressure turbine assembly and the second fan assembly such that the second fan assembly rotates at a rotational speed that is less than the rotational speed of the first fan assembly.

11. A turbine engine assembly comprising:
a core gas turbine engine including a high-pressure compressor, a combustor, a low-pressure turbine, and a high-pressure turbine, said compressor comprising an upstream end and a downstream end, said combustor coupled to said compressor downstream end;
a counter-rotating fan assembly comprising a first fan assembly and a second fan assembly, wherein said counter-rotating fan assembly is coupled to said core gas turbine engine such that air discharged from said counter-rotating fan assembly is channeled directly into an inlet of said gas turbine engine compressor via a passage without passing through a booster compressor, said counter-rotating fan assembly coupled to said low-pressure turbine such that said low-pressure turbine rotates said counter-fan assembly; and
a gearbox coupled between said low-pressure turbine assembly and said counter-rotating fan assembly configured to facilitate rotation of said second fan assembly at a rotational speed that is different than the rotational speed of said first fan assembly.

12. A turbine engine assembly in accordance with claim 11 wherein said counter-rotating fan assembly is selectively sized to discharge compressed air at a first operating pressure, said core gas turbine engine configured to receive the compressed air at approximately the first operational pressure.

13. A turbine engine assembly in accordance with claim 11 wherein said first fan assembly rotates in a first direction and said second fan assembly that rotates in an opposite second direction.

14. A turbine engine assembly in accordance with claim 11 further comprising coupling a counter-rotating fan assembly that discharges a predetermined quantity of air based on the gas turbine engine compression ratio to the core gas turbine engine.

15. A turbine engine assembly in accordance with claim 11 said core gas turbine engine comprises a predetermined quantity of compressor stages based on the compression ratio of said counter-rotating fan assembly and the overall compression ratio of the gas turbine engine assembly.

16. A turbine engine assembly in accordance with claim 15 wherein said core gas turbine engine comprises a predetermined quantity of high-pressure turbine stages based on the compression ratio of said counter-rotating fan assembly and the overall compression ratio of the gas turbine engine assembly.

17. A turbine engine assembly in accordance with claim 13 wherein said low-pressure turbine is coupled to said first fan assembly such that said first fan assembly rotates in a first direction, said turbine engine assembly further comprising:
a gearbox coupled between said low-pressure turbine assembly and said second fan assembly such that said second fan assembly rotates in a second opposite direction.

18. A turbine engine assembly in accordance with claim 13 wherein said counter-rotating fan assembly comprises a first fan assembly configured to rotate at a first rotational speed and a second fan assembly configured to rotate at a second different rotational speed.

19. A turbine engine assembly in accordance with claim 17 further comprising:
a shaft coupled between said low-pressure turbine and said first fan assembly such that said first fan assembly rotates at approximately the same rotational speed as said low-pressure turbine.

20. A turbine engine assembly in accordance with claim 19 further comprising a gearbox coupled between said low-pressure turbine assembly and said second fan assembly such that said second fan assembly rotates at a rotational speed that is less than the rotational speed of said first fan assembly;
a core turbine engine;
a low-pressure turbine coupled to said core turbine engine; and
a counter-rotating fan assembly coupled to said low-pressure turbine, said counter-rotating fan assembly comprising a first fan assembly coupled to said low-pressure turbine and configured to rotate in the first direction and a second fan assembly coupled to said low-pressure turbine, said second fan assembly configured to rotate in an opposite second direction.

* * * * *